(12) United States Patent
Mueller et al.

(10) Patent No.: US 6,309,727 B1
(45) Date of Patent: *Oct. 30, 2001

(54) COATING FOR OPTICAL DISCS

(75) Inventors: William Mueller, Clarks Summit; Edward Pickutoski, Olyphant, both of PA (US)

(73) Assignee: WEA Manufacturing, Inc., Olyphant, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/458,391

(22) Filed: Feb. 28, 1997

Related U.S. Application Data

(60) Provisional application No. 60/012,713, filed on Feb. 29, 1996.

(51) Int. Cl.$^7$ ........................................................ B32B 3/02
(52) U.S. Cl. ........................ 428/64.1; 428/64.2; 428/64.4; 428/64.5; 428/913; 430/270.11; 430/495.1; 430/945; 369/283
(58) Field of Search ................................. 428/64.1, 64.2, 428/64.4, 65.2, 913; 430/270.11, 495.1, 945; 369/283; 427/155, 164

(56) References Cited

U.S. PATENT DOCUMENTS

| | | | |
|---|---|---|---|
| 5,787,069 | * 7/1998 | Lowe | 369/291 |
| 5,935,673 | * 10/1999 | Mueller | 428/64.1 |

* cited by examiner

Primary Examiner—Elizabeth Evans
(74) Attorney, Agent, or Firm—Gottlieb, Rackman & Reisman, P.C.

(57) ABSTRACT

A protective layer is applied to the surface of a compact disc precursor that must be protected from dust during manufacture. The layer is removable and preferably made of ethylene vinyl acetate.

9 Claims, 1 Drawing Sheet

COATING FOR OPTICAL DISCS

This application claims the benefit of Provisional No. 60/012,713 filed Feb. 29. 1996.

FIELD OF THE INVENTION

This invention relates to the process for the manufacturing of optical data storing surfaces, in particular compact discs. It further relates to providing a removable protective coating on the surfaces of the discs during manufacturing.

BACKGROUND OF THE INVENTION

Plastic discs having a pit optical track structure are well known as compact discs. The term compact disc as used in this application includes any disc shaped recorded medium having pits and lands forming an optical track structure on a data information recording planar surface. Thus it includes such discs where the information stored as pits and lands is digital information, analog information, or information of a graphic or holographic nature. Examples of the different types of information storage are as follows: Digital information may be encoded into the pits and lands as pits of quantized lengths interpretable as a stream of digital data, wherein the length of each pit or land segment may be, for example, related to the number of 1's or 0's in a data stream. An example of such a system is the compact disc ("CD") audio or video disc. Analog information may be encoded into the pits and lands as pit lengths that may vary over a continuum of values, wherein the length of each pit or land segment may be, for example, related to a voltage level in a desired output. An example of such a system is the laser disc video recording system. Graphics may be placed on the surface of a disc by employing the light reflection properties of pitted surfaces that are visible to the unaided eye. Similarly holographic information may be stored in a pit/land format, particularly where it is possible to vary the pit depth to create reflection interference patterns that are visible as a holographic image viewable by the unaided eye.

In-line manufacturing systems are utilized for mass producing copies of compact discs. These systems are capable of producing a compact disc every few seconds once a master disc has been produced. The process employs injection molding, electroplating and printing stages.

Manufacture of high density optical discs is well known. This process however normally requires extreme cleanliness in certain operations to prevent defects in the form of scratches, scuffs, dirt, etc. from gathering on the playside of the disc. Such defects represent at a minimum an inferior cosmetic appearance to the disc and quite possibly a functional problem such as a skip or some other audio/video artifact.

BRIEF DESCRIPTION OF THE INVENTION

It is an object of this invention to apply a removable protective coating to the playside of the disc, preferably during the in-line manufacturing process. The method of the present invention comprises the application of such a layer and an appropriate adhesive to the playable surface of the compact disc. Such a protective coating prevents defects from developing on the playside of the disc surface.

DETAILED DESCRIPTION OF A PREFERRED EMBODIMENT

It is desired in accordance with the object of the invention to adhere temporarily a material, preferably such as ethylene vinyl acetate (EVA), to the surface of the disc that must be protected from dust, etc. The application method is designed to operate on an assembly line. A roll of a matrix of the protective film passes between an applicator and a line along which the discs to be protected are being fed. The protective film applicator may be a flat plate which moves to engage the protective coating film and bring it into contact with the disc. The applicator may either cut the appropriate shape from the matrix of materials or pick a precut shape from the matrix.

In order to facilitate the application of the protective substrate and its adhesive by automated methods the substrate cannot be too thin or subject to tearing. The preferred embodiment is to use material for the substrate in a modulus range B>5,000 p.s.i, ASTM D790 73F. To be scratch resistant the thickness is preferred to be greater than 5 microns and the hardness greater than Shore D 10. The substrate also must not be subject to shrinkage that could distort the disc. Preferably the shrinkage is less than 8% at 70 C for 96 hours.

With regard to the characteristics of the adhesive, it must be able to be removed easily and without residue. In the preferred embodiment is a vinyl acetate adhesive for which the peel off pressure is less than 0.01 p.s.i. and no residues of the adhesive are greater than 10 microns in any dimension.

Figure 1:
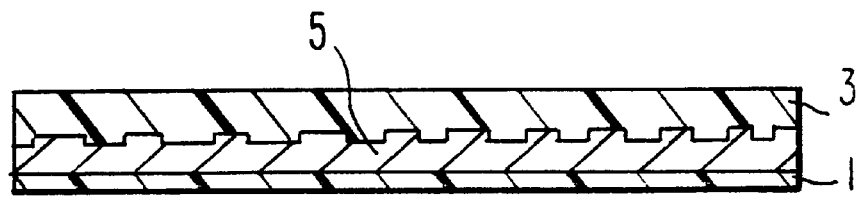
FIG. 1 depicts a side view of the present invention.

As shown in FIG. 1, the protective layer 1 is applied to the surface of the compact disc 3 through which a laser will read the data encoded in a data surface 5, on top of which a metallization layer has been deposited.

Figure 2:
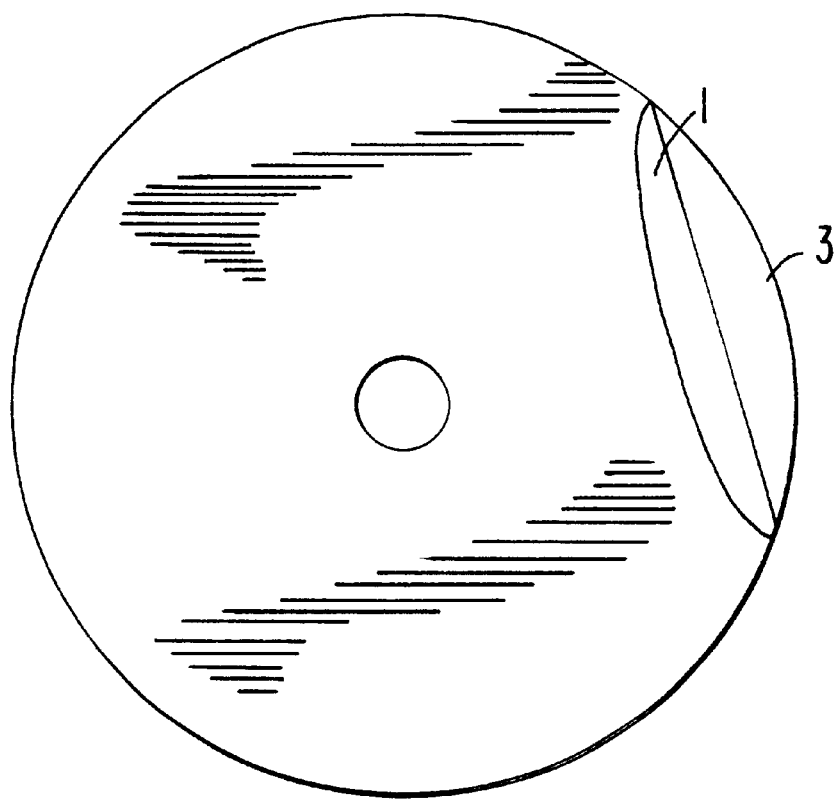
FIG. 2 depicts a top view of the present invention with the protective layer partly pealed back.

FIG. 2 depicts the protective layer partially stripped away from the underlying disc. This would be a necessary step before the disc is inserted into a player to interpret the rthe invention as applied to preferred embodiments thereof, it will be understood that various omissions and substitutions and changes in the form and details of the device illustrated and in its operation may be made by those skilled in the art without departing from the spirit of the invention.

What is claimed is:

1. A compact disc component for use in the fabrication of a compact disc having data recorded thereon in the form of pits and lands impressed into a plastic surface, comprising a disc component comprising the playside surface of the resulting compact disc, a plastic layer with a weakly adhesive surface placed in registration with the playside surface of the compact disc, said plastic layer being strippable from said playside surface without injury to said playside surface, said plastic layer having sufficient thickness and surface integrity to prevent the scratching of said playside surface.

2. The compact disc of claim 1, wherein said plastic layer is composed of material having a modulus B>5000 p.s.i. ASTM D790 73F.

3. The compact disc of claim 1, wherein said plastic layer has a thickness greater than about 5 microns and a hardness greater than Shore D 10.

4. The compact disc of claim 1, wherein said adhesive has a peel off pressure less than 0.01 p.s.i. and leaves no residues greater than 10 microns.

5. A compact disc component for use in the fabrication of a compact disc having data recorded thereon in the form of pits and lands impressed into a plastic surface, comprising a disc component comprising the playside surface of the resulting compact disc, a removable plastic protective layer, and an adhesive layer on said removable plastic protective layer, said adhesive layer having a peel off pressure less than 0.01 p.s.i. that leaves no residues greater than 10 microns placed in registration with the playside surface of the compact disc, said plastic layer being strippable from said playside surface without injury to said playside surface, said plastic layer having a thickness greater than about 5 microns and a hardness greater than Shore D 10, wherein, prior to removal by pealing, said plastic layer prevents the scratching of said playside surface.

6. The method of manufacturing a compact disc wherein, comprising the steps of adhering to the playside surface of a compact disc a plastic layer and a weak adhesive placed in registration with the playside surface of the compact disc, said plastic layer having sufficient thickness and surface integrity to prevent the scratching of said playside surface, stripping said plastic layer and adhesive from said playside surface without injury to said playside surface or adhesive residue being left on the disc.

7. The method of forming a compact disc of claim 6, wherein the plastic layer is composed of material having a modulus B>5000 p.s.i. ASTM D790 73F.

8. The method of forming a compact disc of claim 6, wherein said plastic layer has a thickness greater than about 5 microns and a hardness greater than Shore D 10.

9. The method of forming a compact disc of claim 6, wherein said adhesive has a peel off pressure less than 0.01 p.s.i. and leaves no residues greater than 10 microns.

* * * * *